United States Patent [19]
Traber et al.

[11] Patent Number: 5,577,785
[45] Date of Patent: Nov. 26, 1996

[54] SINGLE-HAND ACTUATED PICK-UP TOOL

[75] Inventors: Arthur Traber, San Diego; Robert S. Traber, Escondido, both of Calif.

[73] Assignee: Arcoa Industries, Escondido, Calif.

[21] Appl. No.: 526,665

[22] Filed: Sep. 11, 1995

[51] Int. Cl.[6] ....................................................... B25J 1/00
[52] U.S. Cl. ............................................. 294/19.1; 294/100
[58] Field of Search ...................... 294/8.5, 11, 19.1–19.3, 294/22–24, 50.8, 50.9, 99.1, 100, 104, 115; 81/53.11, 53.12

[56] References Cited

U.S. PATENT DOCUMENTS

| | | | |
|---|---|---|---|
| 2,320,611 | 6/1943 | Kandle | 294/100 |
| 2,613,100 | 10/1952 | Casey | 294/19.1 |
| 2,616,741 | 11/1952 | Ziese | 294/19.1 |
| 2,869,914 | 1/1959 | Yoakley | 294/22 |
| 3,527,492 | 9/1970 | Hollis | 294/19.1 |
| 4,962,957 | 10/1990 | Traber | 294/19.1 |

*Primary Examiner*—Johnny D. Cherry
*Attorney, Agent, or Firm*—John J. Murphey; Murphey Law Offices

[57] ABSTRACT

A single-hand actuated pick-up tool, including an elongated hollow stalk terminating at spaced-apart distal and proximal ends, first and second short, flexible, spring pick-up fingers extending divergently outward from the distal end of the stalk and including flexible elements terminating the outer ends of the fingers for grasping an object when brought toward one another, a center strap extending from the first pick-up finger interiorly along the stalk and then back interiorly to the second pick-up finger, a handle formed in cooperation with the stalk including a handle member pivotally mounted to the stalk and further including a device for drawing the center strap rearward the fingers when the handle member is pivoted toward the stalk, and a first hollow stalk plug for slidable insertion in the distal end of the stalk for retaining the fingers by friction in mounted position in the stalk.

19 Claims, 3 Drawing Sheets

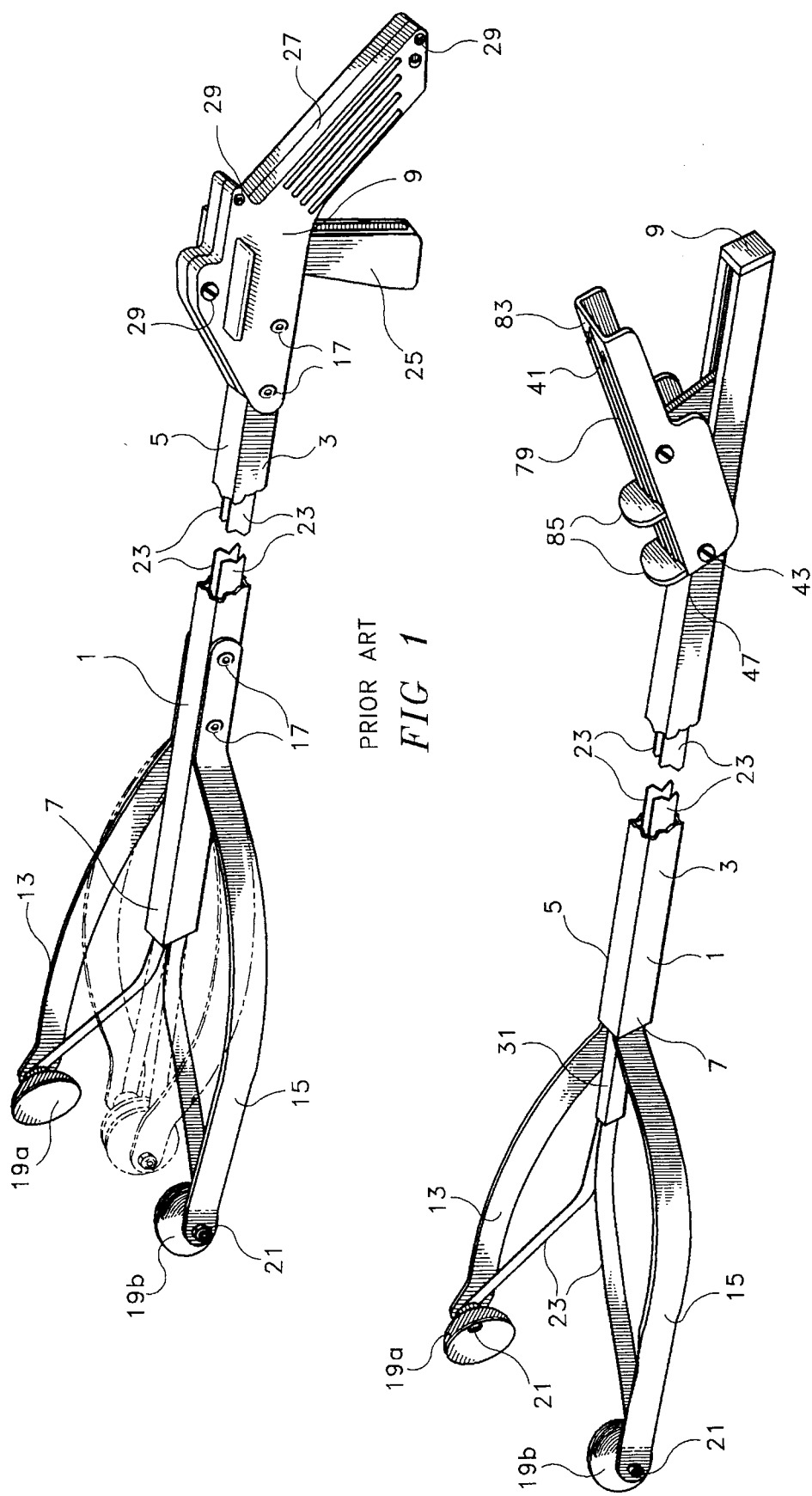

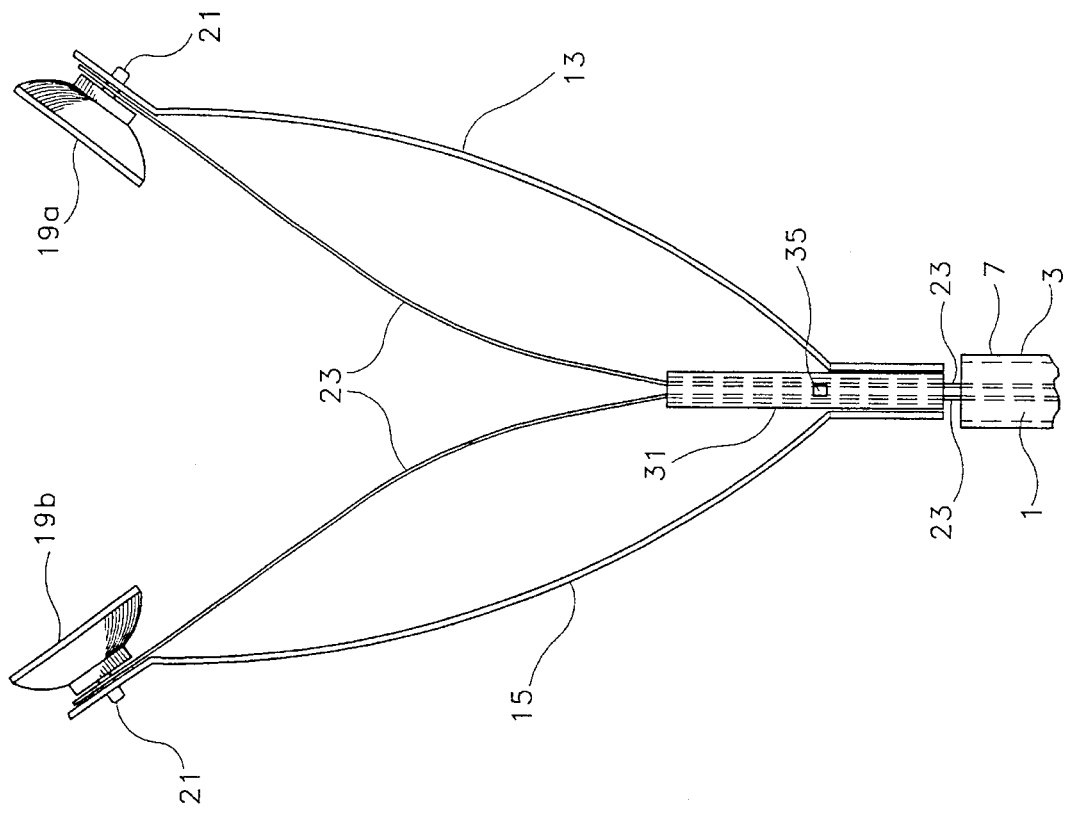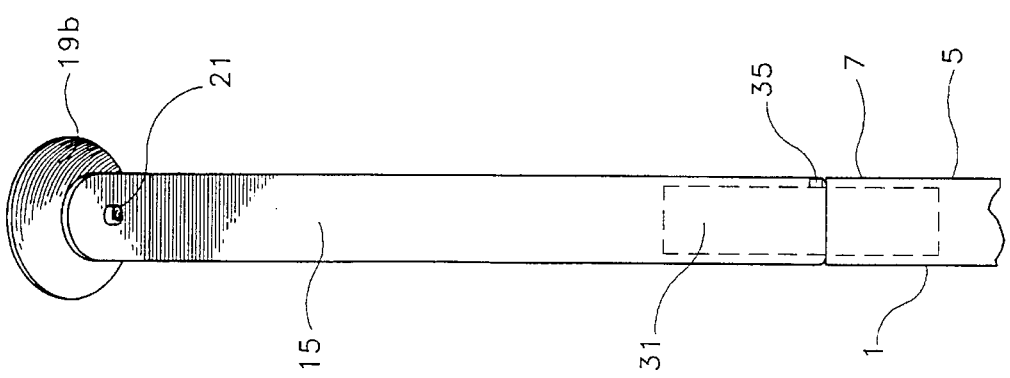

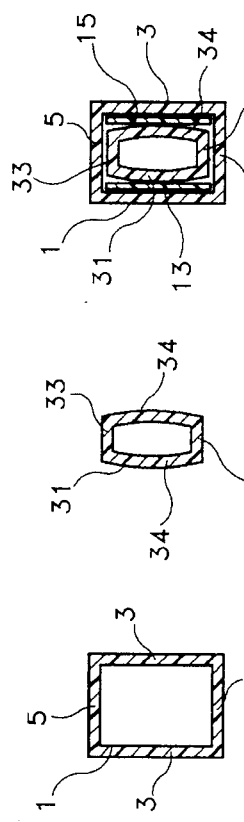
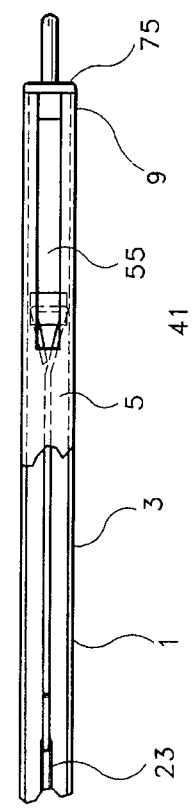
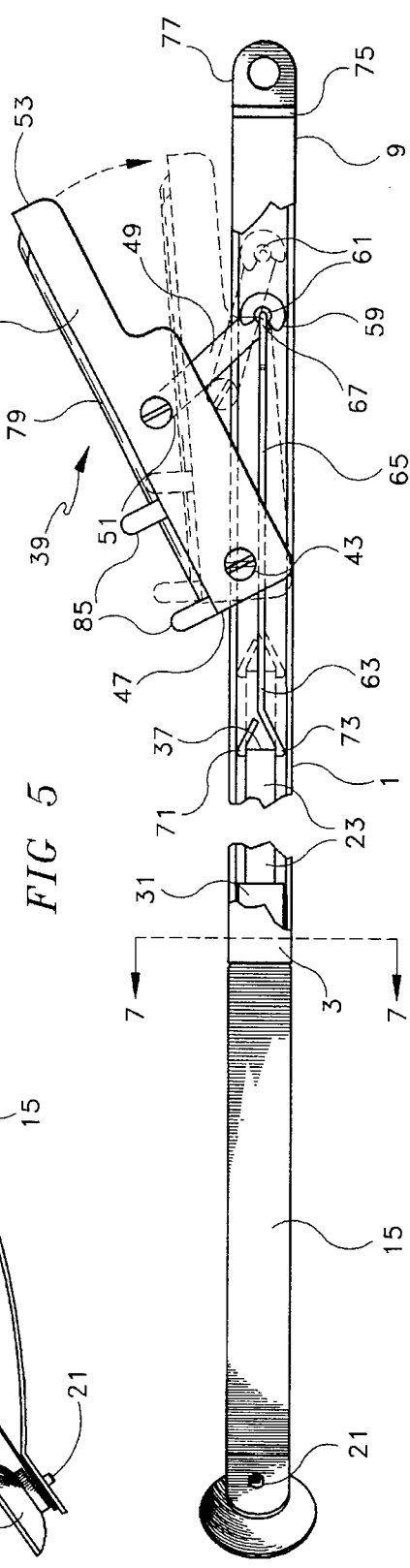
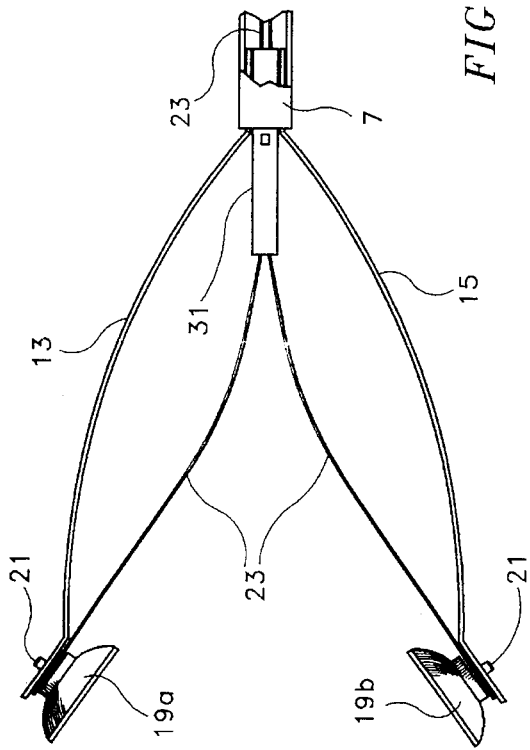

SINGLE-HAND ACTUATED PICK-UP TOOL

BACKGROUND OF THE INVENTION

1. Field of the Invention

This invention pertains to the field of hand-actuated tools. More particularly, this invention pertains to the field of single-hand actuated pick-up tools that are used by those who have difficulty reaching and fetching objects, such as bottles, plates, shoes, and the like, and to a specific tool that is cheaper to manufacture and assemble, and therefore is sold at lower prices, than those presently on the market.

2. Description of the Prior Art

The tool of this invention comprises an elongated stalk with a pair of flexible fingers diverging from the far or distal end of the stalk. A pair of rubber cups is attached one to the end of each finger. A center strap is connected to the fingers and is directed in through the interior of the stalk to a handle at the other end and has a squeezable trigger at the inner or proximal end. By squeezing the trigger, the cups are made to close onto or around an object being picked up by the holder of the tool.

This tool was first patented in the U.S. Pat. No. 3,527,492 and still is in production, enjoying great commercial acceptance and significant sales. It is used by those who are infirm and require aid in reaching and gathering objects of all types. Further, it is used by persons who clean our parks and roadways of trash and debris. It is used by young and old alike and its use is expected to continue for many years.

It is believed the popularity of this device is supported in large part by the fine design and craftsmanship that goes into its manufacture. The center stalk is made of lightweight aluminum; its handle is formed from strong injection molded plastic and the fingers, center strap, and fittings are made of first-class stainless steel. This tool has a lifetime warranty and will not break, even under heavy and harsh usage.

There is, however, an area of daily life where such a tool is required on an interim basis, i.e., for only a short period of time, and where the expensive materials that go into making up the patented tool are not needed. Indeed, there is a need for such a tool that will sell for significantly less money than the patented one and that will not have to last so long or withstand such rugged treatment as the patented tool.

Part of the rather large selling price of the patented tool is the cost to assemble it. Many screws and rivets are used to hold the parts together. Each part must be drilled for these fasteners and each fastener must be driven into its base to obtain assembly of the requisite parts. This work is time-consuming and costly, and adds to the price of the tool.

SUMMARY OF THE INVENTION

This invention is a hand-actuated, pick-up tool for use by those who do not need the heavy duty pick-up tool disclosed and claimed in the aforesaid patent. It is of lighter weight, owing to the broad use of plastics. It has fewer parts and is simpler to assemble. Far fewer fasteners are required in this new tool so that assembly time is greatly reduced. A unique stalk plug is used in this invention that accomplishes a number of heretofore separate operations. This plug makes assembly quite rapid resulting in lower manufacturing and assembly costs and reduced sales price. Further, the large, heavy handle of the patented device has been reduced to a novel, squeezable member that further reduces the weight and size of the tool. Finally, the unique squeezable handle of this invention exhibits a greater mechanical advantage so that to grasp an object requires less hand-power than the prior art device.

Accordingly, the main object of this invention is a hand-actuated, pick-up tool that is lighter, has fewer parts, and is cheaper to manufacture than the existing pick-up tool readily available on today's market. Other objects of this invention include a tool that is more rapidly assembled than the patented one; a tool that is easier to manipulate than existing tools due to the light weight emanating from the extensive use of plastics; a tool that does not last so long as the metal tool presently available so that selling prices can be reduced with savings to medical insurance companies as well as to the medical profession; and, a tool that exhibits a greater mechanical advantage in the area of the handle.

These and other objects of the invention will become more apparent by reading the following Description of the Preferred Embodiment taken together with the drawings that are appended hereto. The scope of protection sought by the inventors may be gleaned from a fair reading of the claims that conclude this specification.

DESCRIPTION OF THE DRAWINGS

FIG. 1 is a trimetric view of the reacher of the prior art;

FIG. 2 is a trimetric view of the preferred embodiment of the reacher of the present invention;

FIG. 3 is a close-up side view of the distal end of the reacher of this invention showing the unique stalk plug assembly feature displaced from the distal end of the stalk;

FIG. 4 is a close-up side view, 90° from the view of FIG. 3, of the same distal end of the reacher but with the stalk plug assembled (inserted) in the distal end of the stalk to assemble and mount the pick-up fingers therein;

FIG. 5 is a top view of the reacher of this invention, without the handle, showing how the center strap is arranged in the stalk of the tool;

FIG. 6 is a side view, partially in section of one embodiment of the reacher of this invention; and, FIGS. 7a, 7b and 7c are cross sectional views of the stalk, the stalk plug, and the pick-up fingers, alone and in combination, taken along lines 7—7 in FIG. 6.

DESCRIPTION OF THE PREFERRED EMBODIMENT

Turning now to the drawings, where like elements are identified by like numerals throughout the nine figures, FIG. 1 shows the reacher of the prior art to comprise an elongated hollow stalk 1, made up of a pair of spaced apart wide side walls 3 and a pair of spaced apart narrower end walls 5 attached together along their respective side edges to form a rectangular, cross sectional hollow member made of thin-walled, extruded aluminum terminated at spaced-apart distal and proximal ends 7 and 9, respectively. The rectangular cross-section of a typical stalk 1 of the prior art (and of the stalk of this invention) is shown in FIG. 7a. First and second short, flexible, spring pick-up fingers 13 and 15 are attached at their proximal ends to the outside of stalk 1 by rivets 17 and are attached to flexible elements or cups 19a and 19b at their distal ends by post and nut combination 21.

A center strap 23 extends from each cup 19a through the interior of stalk 1 to a trigger 25 that is pivotally mounted at stalk proximal end 9 and is adapted to pull center straps 23 rearward when squeezed as part of a handle 27 formed thereabout at stalk proximal end 9. The rearward pull of center straps 23 causes cups 19a and 19b to come together for grasping an object by flexing and bending pick-up fingers 13 and 15 toward each other. Handle 27 is made up of two injection-molded, half-handles that are attached together and to stalk 1 by numerous rivets 17 and screws 29.

As shown, this prior art device is made up of numerous special parts, molded or cut from metal and plastic, that require intensive labor to assemble. Accordingly, this device carries a rather large price tag and is so strong it can support the lifetime warranty given to it by the manufacturer.

The device of this present invention is shown in FIG. 2 and shows a similar stalk 1, of similar wide side walls 3 and end walls 5, and with a rectangular stalk cross-section as depicted in FIG. 7a, this time made of thin-walled plastic and far lighter in weight than the prior art stalk, and similarly terminated by a distal end 7 and a proximal end 9. A pair of relatively short, flexible, spring pick-up fingers 13 and 15 extend from stalk distal end 7, convex to each other; however, they are not riveted to the exterior of stalk 1 as in the prior art device. Fingers 13 and 15 are preferably assembled in spaced-apart, convex, facing arrangement inside stalk 1 as shown in FIGS. 3 and 4.

As shown in FIGS. 3 and 4, a unique method of assembly is used in this invention that comprises a hollow stalk plug 31. Plug 31 comprises a pair of flat end walls 33 of a width slightly less than (i.e., a few thousandths of an inch) the inside distance between side walls 31 interior of stalk 1 less the combined thickness of pick-up fingers 13 and 15, and a pair of side walls 34. Side walls 34 are of a width substantially equal to the inside width of stalk side walls 3 and are bowed outward along the middle thereof a few thousandths of an inch from planar as shown in FIG. 7b. This design has the effect of making stalk plug 31 a tight-fitting plug for insertion in distal end 7 of stalk 1. When inserted, bowed side walls 34 fit tightly against the interior surface of pickup fingers 13 and 15 and hold them fixedly against the inside surface of stalk side walls 3. Plug side walls 34 are stressed toward becoming flat against pickup fingers 13 and 15 and it is this stress which holds plug 31 tightly inside stalk 1. The bow in side walls 34 also compensates for manufacturing tolerances in stalk 1. This is especially beneficial for rapid assembly when pick-up fingers are molded by injection molding to be fully formed and thus not require cutting and forming as in the case of the prior art device.

This unique assembly allows plug 31 to be inserted in stalk distal end 7 and with it the pair of flexible pick-up fingers 13 and 15, each positioned between plug side wall 34 and stalk side wall 3 so that, as plug 31 is seated about half its length in stalk distal end 7, it squeezes both pick-up fingers solidly in the distal end 7 of stalk 1 by friction as shown in FIG. 7c.

A small external pimple 35 may be formed on the exterior surface of plug side wall 34 (or on end wall 33), preferably about half-way along its total length, to abut with distal end 7 of stalk 1 and prevent plug 31 from being inserted further into distal end 7. Where this is not desired, a small drop of glue may be placed on that portion of stalk plug 31 that will be placed against the interior of end-wall 5 of stalk 1 to hold plug 31 tightly inside distal end 7. Accordingly, in one step, the full distal end of stalk 1 is fully assembled using plug 31 instead of the separate operations involving drilling and riveting the proximal ends of pick-up fingers 13 and 15 to stalk 1.

In the prior art device shown in FIG. 1, center straps 23 are bolted to trigger 25 which requires a separate assembly operation. In the invention shown in FIG. 2, and as further shown in FIG. 5, a single center strap 23 is used and is merely reverse-bent at its center 37 and brought back out through stalk distal end 7 to the distal ends of the two pick-up fingers 13 and 15 whereupon the ends of center strap 23 are riveted (not bolted) to the distal ends of pick-up fingers 13 and 15 and to cups 19a and 19b respectively. This assembly operation removes one bolting operation inside stalk 1, thus lessening the assembly cost of the invention over that shown in FIG. 1. Also, the forces on center strap 23, imparted during operation of the reacher, tend to retain plug 31 in place in stalk distal end 7.

As shown in FIG. 6, at the proximal or near end 9 of stalk 1, the trigger 25 and full handle 27 of the prior art device are completely eliminated. A squeezable handle 39 is formed partially in stalk 1 by a U-shaped handle member 41 that is pivotally mounted to stalk 1, inboard from proximal end 9, by a pair of plastic "push-screws" 43 that are pressed into matching holes formed respectively in stalk 1 and one end 47 of handle member 41. The U-shape is conducive to having said member 41 folded down onto the exterior of stalk 1 during actuation of handle 39. A handle link 49 is pivotally mounted at one end 51 to handle member 41, intermediate handle member ends 47 and 53, and slanted downward through a slot 55 formed in stalk upper end wall 5 underneath said handle member 41. The other end 59 of said handle link 49 terminates interior of stalk 1, between side walls 3 and end walls 5, and is adapted to slide rearward, inside stalk 1 as handle 41 is squeezed toward stalk 1 as shown in dotted line in FIG. 6. This is known as a modified Scott-Russell straight-line motion device.

An aperture 61 is formed in handle link end 59 for interconnection with a wire link 63, comprising a short length 65 of wire that is connected at one end 67 to said aperture 61. The other end 71 of wire link 63 is formed into a hook 73 that is connected to center strap center 37 interior of stalk 1. In operation, pick-up fingers 13 and 15 are formed divergent from stalk distal end 7 and bias cups 19a and 19b apart and extended from stalk distal end 7. In this configuration, handle member 41 is biased fully open by said pick-up fingers 13 and 15 and handle member 41 is pivoted away from stalk 1.

To bring cups 19a and 19b together about an object to be picked up, handle member 41 is squeezed toward stalk 1 to pivot handle link 49 about handle member 41 and slide handle link end 53 rearward interiorly of stalk 1 thereby pulling wire link 63 rearward along with center strap 23 to pull the distal ends of pick-up fingers 13 and 15 together. The mechanical advantage of this modified Scott-Russell device is vastly superior to that of the squeezable handle of the prior art device shown in FIG. 1.

Handle 41 is assembled by only two fasteners, one on each side of stalk 1 and two fasteners, one on each side of handle member 41. In the prior art device, shown in FIG. 1, handle 27 is assembled using at least seven fasteners in each handle half and thus is far more expensive to manufacture. The fasteners used in this invention are ribbed plastic screws that are easily insertable by merely pressing into the matching holes of the parts. Not only are expensive metal fasteners avoided but the assembly time is greatly reduced.

For convenience, slot 55 in stalk 1 is terminated by a plug 75 that is inserted in the open proximal end 9 of stalk 1 and, further, said plug is formed into a loop 77 for connection to a hook (not shown) for ease in hanging up the device when not in use.

As shown in FIGS. 2 and 6, a plurality of ribs 79 is formed on the upper surface 83 of handle member 41 to serve the dual purposes of stiffening handle member 41 and providing sufficient roughness to said member that handle 39 is made more easy to grasp. At least one, but preferably a pair, of spaced-apart fences 85 are formed transversely on upper handle member surface 83 near pivoted end 47 for adding stability to the use of the inventive device, see FIGS. 2 and 6.

This invention is accordingly lighter in weight, using less, lighter and cheaper materials, and is assembled using fewer steps and far fewer fasteners than the prior art device, to produce a cheaper, albeit strong and usable reacher device for those whose requirements do not run to the heavier, stronger reacher of the prior art.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same results are within the scope of this invention.

What is claimed is:

1. A single-hand actuated pick-up tool, comprising:
   a) an elongated hollow stalk terminating at spaced-apart distal and proximal ends;
   b) first and second short, flexible, spring pick-up fingers extending divergently outward from said distal end of said stalk and including flexible elements terminating the outer ends of said fingers for grasping an object when brought toward one another;
   c) a center strap extending from said first pick-up finger interiorly along said stalk and then back interiorly to said second pick-up finger;
   d) a handle formed in cooperation with said stalk including a handle member pivotally mounted to said stalk and further including means for drawing said center strap rearward said fingers when said handle member is pivoted toward said stalk; and,
   e) a first hollow stalk plug for slidable insertion in said distal end of said stalk for retaining said fingers by friction in mounted position in said stalk.

2. The single-hand actuated pick-up tool of claim 1 wherein said stalk is a thin-walled, extruded hollow member.

3. The single-hand actuated pick-up tool of claim 2 wherein said stalk has a rectangular cross section.

4. The single-hand actuated pick-up tool of claim 1 wherein said pick-up fingers are injection molded to the final size and shape.

5. The single-hand actuated pick-up tool of claim 1 wherein said pick-up fingers are inserted in said distal end of said stalk and assembled in spaced-apart, convex, facing arrangement.

6. The single-hand actuated pick-up tool of claim 1 wherein one of said pick-up fingers, its correspondingly adjacent flexible element and one end of said center strap are all joined together with a single rivet.

7. The single-hand actuated pick-up tool of claim 1 wherein said center strap extends substantially to said handle.

8. The single-hand actuated pick-up tool of claim 1 wherein said handle member is U-shaped in cross section.

9. The single-hand actuated pick-up tool of claim 1 wherein said handle member is short and pivoted at said proximal end to said stalk.

10. The single-hand actuated pick-up tool of claim 1 wherein said stalk comprises a pair of spaced-apart side walls and a pair of spaced-apart end walls attached together along their respective side edges, and said means includes:
    a) a handle link pivotally attached at one end to said handle member;
    b) a slot formed in one of said end walls of said stalk underneath said handle member;
    c) said slot of a size and shape to allow said handle link to slide therethrough;
    d) said handle link having an end, opposite said pivotally attached end, for sliding interiorly said stalk; and,
    e) a wire link of terminal length interior said stalk, having one end thereof attached to said center strap and the other end thereof attached to said handle link end located interior said stalk, for interconnecting said handle link and said center strap, so that squeezing said handle member toward said stalk causes said center strap to be pulled rearward interior said stalk and bring said flexible elements together.

11. The single-hand actuated pick-up tool of claim 1 wherein said flexible elements are rubber cups.

12. The single-hand actuated pick-up tool of claim 1 further including ribs formed on the exterior of said handle member to increase the stiffness thereof.

13. The single-hand actuated pick-up tool of claim 1 further including ribs formed longitudinally on the exterior of said handle member to increase the roughness of said handle member to make said handle more easy to grasp.

14. The single-hand actuated pick-up tool of claim 1 further including at least one fence formed transversely across the exterior of said handle member to add stability to the use of said tool.

15. The single-hand actuated pick-up tool of claim 1 further including a pair of spaced-apart fences formed transversely across the exterior of said handle member for capturing the first joint of the index finger therein to add stability to the use of said tool.

16. The single-hand actuated pick-up tool of claim 1 further including a plug for insertion into said proximal end of said stalk.

17. The single-hand actuated pick-up tool of claim 16 further including a loop formed exterior said plug, inserted into said proximal end of said stalk, for use in hanging up said tool when not in use.

18. A single-hand actuated pick-up tool, comprising:
    a) an elongated hollow stalk, comprising a pair of spaced-apart side walls and a pair of spaced-apart end walls attached together along their respective side edges terminating at spaced-apart distal and proximal ends;
    b) first and second short, flexible, spring pick-up fingers extending in spaced-apart, convex, facing arrangement, divergently outward from said distal end of said stalk and including flexible elements terminating the outer ends of said fingers for grasping an object when brought toward one another;
    c) a center strap extending from said first pick-up finger interiorly along said stalk and then back interiorly to said second pick-up finger;

d) a handle formed in cooperation with said stalk including a member pivotally mounted to said stalk and further including means for drawing said center strap rearward said fingers when said member is pivoted toward said stalk; and, e) a first hollow stalk plug for slidable insertion in said distal end of said stalk for retaining said fingers by friction in mounted position in said stalk, said plug comprising:

i) a pair of flat end walls of a width slightly less than the inside distance between said side walls interior of said stalk and the combined thickness of said pick-up fingers; and, ii) a pair of side walls of a width substantially equal to the inside width of said stalk side walls and bowed outward along the middle thereof;

iii) said end walls and said bowed side walls insertable in said distal end of said stalk, to squeeze said pick-up fingers therebetween to hold said fingers tightly in said stalk distal end by friction.

19. The single-hand actuated pick-up tool of claim 18 wherein said first stalk plug is insertable approximately one-half its length in said distal end of said stalk.

* * * * *